United States Patent
Skeels et al.

(10) Patent No.: US 8,316,163 B2
(45) Date of Patent: Nov. 20, 2012

(54) HDMI-QUALITY CONTENT TRANSMISSION ALONG A SINGLE MEDIUM

(75) Inventors: Stephen J. Skeels, Manlius, NY (US); Steven K. Shafer, Chittenango, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 1471 days.

(21) Appl. No.: 11/852,699

(22) Filed: Sep. 10, 2007

(65) Prior Publication Data
US 2009/0067488 A1  Mar. 12, 2009

(51) Int. Cl.
G06F 13/00 (2006.01)
G06F 3/00 (2006.01)

(52) U.S. Cl. ......... 710/65; 710/2; 710/5; 710/8; 710/20; 710/33

(58) Field of Classification Search ........................ None
See application file for complete search history.

(56) References Cited

U.S. PATENT DOCUMENTS

| | | |
|---|---|---|
| 6,941,395 B1 | 9/2005 | Galang et al. |
| 7,074,088 B1 | 7/2006 | Tsai |
| 7,149,833 B2 | 12/2006 | McLeod |
| 7,149,835 B2 | 12/2006 | Engler |
| 2003/0014766 A1 | 1/2003 | Dinwiddie et al. |
| 2005/0169314 A1 | 8/2005 | Beaudoin et al. |
| 2006/0010274 A1 | 1/2006 | Olson |
| 2006/0036788 A1 | 2/2006 | Galang et al. |
| 2006/0067690 A1* | 3/2006 | Tatum et al. ................ 398/66 |
| 2006/0092893 A1 | 5/2006 | Champion et al. |
| 2006/0238524 A1 | 10/2006 | Hsieh et al. |
| 2006/0239310 A1 | 10/2006 | Salz |

FOREIGN PATENT DOCUMENTS

| | | |
|---|---|---|
| JP | 2004213949 A | 7/2004 |
| KR | 20050080604 A | 8/2005 |
| KR | 20060013035 A | 2/2006 |

OTHER PUBLICATIONS

PCT/US2008/075158 International Preliminary Report on Patentability, Date of Mailing: Mar. 25, 2010. 6 pp.

* cited by examiner

*Primary Examiner* — Scott Sun
(74) *Attorney, Agent, or Firm* — Schmeiser, Olsen & Watts LLP

(57) ABSTRACT

In a presentation system, a source device provides uncompressed presentation content in an HDMI format. A first conversion device converts the uncompressed presentation content to an uncompressed second format and entirely transmits the uncompressed presentation content in the second format along an electrically conductive member. A second conversion device receives the uncompressed presentation content in the second format from the conductive member and converts the uncompressed presentation content to the HDMI format. For example, the conductive member may be that of a coaxial cable.

16 Claims, 2 Drawing Sheets

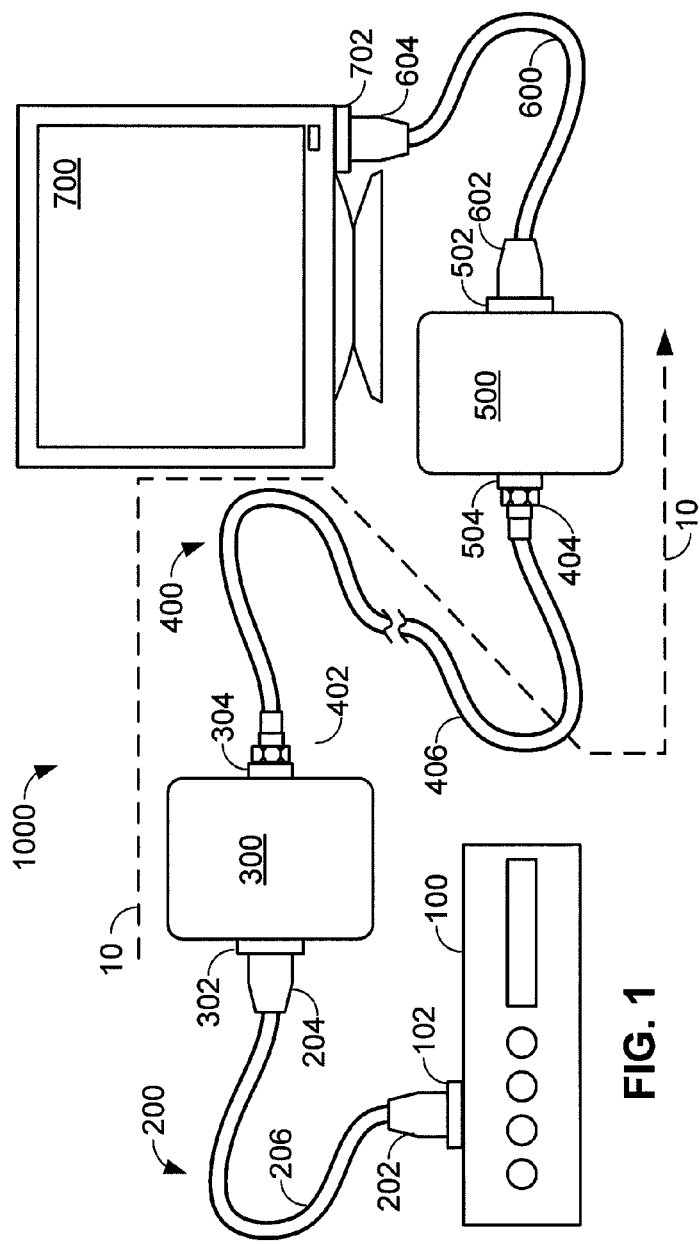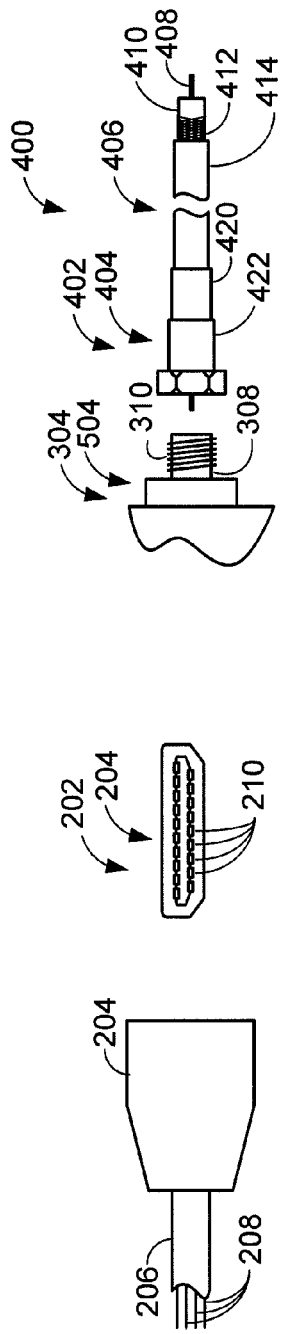

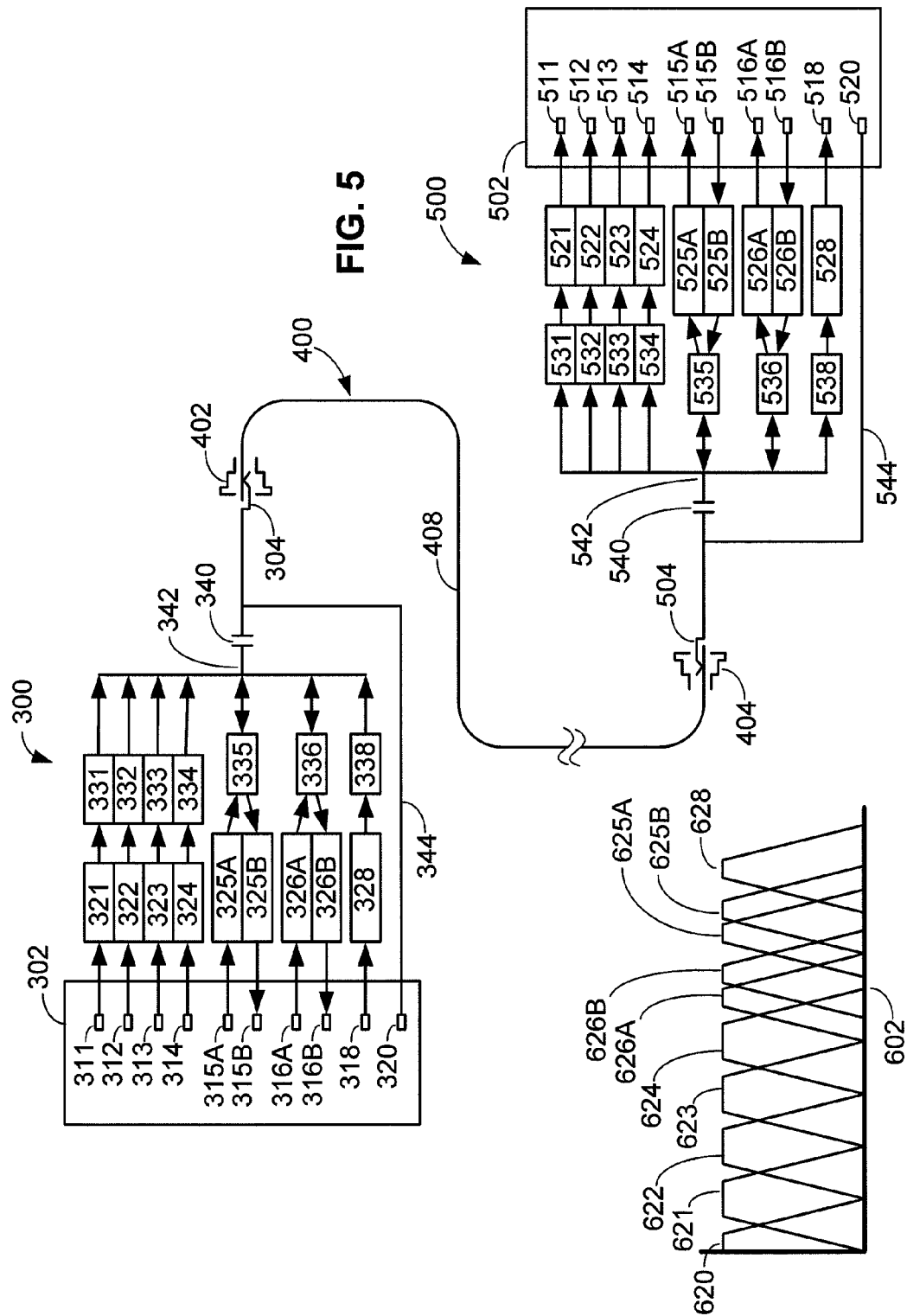

HDMI-QUALITY CONTENT TRANSMISSION ALONG A SINGLE MEDIUM

BACKGROUND OF THE INVENTION

High-Definition Multimedia Interface (HDMI) compliant devices are growing in popularity in view of the optimized picture qualities and standardized multi-device controls available in this popular standard. Such devices have multi-pin HDMI connectors by which several devices can be interconnected through HDMI cables having multiple lines carrying respective HDMI signal components. Typically, three HDMI channels convey audio and video presentation content and a fourth clock channel conveys a signal that prescribes the rate at which video and audio content is presented. The HDMI standard includes various other channels related to controlling, powering, and synchronizing devices. Nineteen-pin and twenty-nine pin connectors are available in the HDMI standard.

Unfortunately, HDMI cables are typically expensive and are not readily available in arbitrary lengths. Their constructions typically include multiple shielded twisted pairs of wires. Users may prefer to place content-providing devices and presentation devices in separate locations and typically prefer to avoid the cluttered appearance of cables. Thus, even a room having modest dimensions may represent a challenge when aesthetic considerations are applied and wires disposed in full view across floors and coiled in corners are not wanted. As the length of an HDMI cable increases, the cost increases and the transmission quality reduces. Thus, excess length for a given user environment should be avoided. However, home entertainment installation technicians are typically unprepared to assemble a custom HDMI compliant cable at a user location. If available shorter HDMI cables are to be utilized in series, then jumpers, boosters, or repeaters are needed and the problems of clutter and expense again arise.

Current technologies that transmit HDMI wirelessly rely upon compression techniques to reduce signal content in order to conduct transmissions in narrow radio-frequency (RF) spectrums that are crowded with competing signals. Such compression techniques degrade the quality of the presentation of content downstream of the wireless transmission.

Therefore, flexible and cost-efficient systems and methods are needed for conveying high-quality uncompressed presentation content from an HDMI-compliant source device to an HDMI compliant presentation device.

BRIEF SUMMARY OF THE INVENTION

The present invention addresses the above needs and enables other advantages by providing systems and methods in which uncompressed presentation content is converted from an HDMI format to an uncompressed second format for transmission along a single electrically conductive member. According to at least one aspect of the invention, a presentation system includes a source device, an electrically conductive member, a first conversion device in electrical communication with the source device and the conductive member, a second conversion device in electrical communication with the conductive member, and a presentation device in electrical communication with the second conversion device. The source device provides uncompressed presentation content in an HDMI format. The first conversion device receives the uncompressed presentation content from the source device, converts the uncompressed presentation content to an uncompressed second format, and entirely transmits the uncompressed presentation content in the second format along the conductive member. The second conversion device entirely receives the uncompressed presentation content in the second format from the conductive member and converts the uncompressed presentation content to the HDMI format. The presentation device entirely receives the uncompressed presentation content in the HDMI format and presents the uncompressed presentation content. In at least one embodiment in this aspect of the invention, the first conversion device converts the uncompressed presentation content to an uncompressed second format in which the uncompressed presentation content is conveyed by oscillatory electrical signal components each in a respective frequency range. The first conversion device, the electrically conductive member, and the second conversion device define a transmission path, which may have a length exceeding twenty five feet. Indeed, the electrically conductive member may have a contiguous length in excess of twenty five feet.

According to another aspect of the invention, a system includes a first HDMI connector, an electrically conductive member, modulator devices in respective electrical communication with input members of the first HDMI connector and in electrical communication with the conductive member, demodulator devices in electrical communication with the conductive member, and a second HDMI connector having output members in respective electrical communication with the demodulator devices. The input members of the first HDMI connector are structured to receive respective first HDMI signal components together conveying uncompressed presentation content. The modulator devices are structured to generate respective oscillatory electrical signal components together entirely conveying the uncompressed presentation content. The demodulator devices are structured to generate respective second HDMI signal components together entirely conveying the uncompressed presentation content upon receipt of the oscillatory electrical signal components from the conductive member. The electrically conductive member may be the central conductive member of a coaxial cable, and may have a length in excess of twenty five feet. In at least one embodiment, the modulator devices are structured to generate respective oscillatory electrical signal components in respective frequency ranges, the frequency range of each oscillatory electrical signal component being different from the frequency range of each other oscillatory electrical signal component. Filters, structured to pass oscillatory signal components in respective frequency ranges, may be disposed in respective electrical communication with the modulator devices and the demodulator devices.

According to another aspect of the invention, a system includes a first HDMI connector, a first coaxial-cable connector, modulator devices in respective electrical communication with input members of the first HDMI connector and in electrical communication with the first coaxial cable connector, a second coaxial-cable connector, and demodulator devices in electrical communication with the second coaxial-cable connector. The input members of the first HDMI connector are structured to receive respective electrical first signal components in and HDMI format together conveying uncompressed presentation content. The modulator devices are structured to generate respective oscillatory electrical signal components in an uncompressed second format together entirely conveying the uncompressed presentation content upon receipt of the electrical first signal components in the HDMI format. The demodulator devices are structured to generate respective second signal components in the HDMI format upon receipt of the oscillatory electrical signal components in the second format by the second coaxial-cable connector, the second signal components in HDMI format together entirely conveying the uncompressed presentation content.

According to yet another aspect of the invention, a method entails receiving HDMI signal components conveying uncompressed presentation content at respective input members, transmitting the uncompressed presentation content along a single electrically conductive member, receiving the uncompressed presentation content from the conductive member, and generating HDMI signal components entirely conveying the uncompressed presentation content upon receiving the uncompressed presentation content from the conductive member. In at least one embodiment, transmitting the uncompressed presentation content entails generating oscillatory electrical signal components in respective frequency ranges and transmitting the oscillatory electrical signal components along the single conductive member. The oscillatory electrical signal components may be filtered, each in its respective frequency range. The uncompressed presentation content may be presented by a presentation device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 illustrates a presentation system in accordance with at least one embodiment of the invention and in which a transmission path disposed between conventional HDMI cables is defined by inventive conversion devices and a conventional coaxial cable;

FIG. 2 represents a head portion of a conventional HDMI cable;

FIG. 3 illustrates electrically conductive members of the HDMI cable of FIG. 2;

FIG. 4 represents a conventional coaxial cable proximal a coaxial cable connector;

FIG. 5 diagrammatically represents the conversion devices of FIG. 1;

FIG. 6 represents an exemplary frequency allocation scheme by which frequency ranges are allocated for paired modulators and demodulators in the system of FIG. 1.

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A presentation system 1000, in accordance with at least one embodiment of the invention, is shown in FIG. 1. A presentation content source device 100 provides uncompressed presentation content in a High-Definition Multimedia Interface (HDMI) format. For example, the source device 100 may be a digital video disk (DVD) player, a digital video recorder (DVR) device, or other electronic device that hosts and provides presentation content or that receives and provides presentation content. The presentation content provided by the source device 100 propagates along a first HDMI cable 200 to a first conversion device 300. The first conversion device 300 receives the presentation content in the HDMI format, converts the presentation content to an uncompressed second format, and transmits entirely the uncompressed presentation content in the second format along a single electrically conductive member to a second conversion device 500. In at least one embodiment, the first conversion device transmits the presentation content along the central conductive member 408 (FIG. 4) of a coaxial cable 400. The second conversion device 500 entirely receives the uncompressed presentation content in the second format from the electrically conductive member and converts the uncompressed presentation content to the HDMI format. The uncompressed presentation content in the HDMI format then propagates along a second HDMI cable 600 from the second conversion device 500 to a presentation device 700, which presents the uncompressed presentation content for appreciation by one or more users. For example, the presentation device can be a high-definition television (HDTV) unit, a projector, or other display device.

The first conversion device 300, the coaxial cable 400, and the second conversion device 500 define a transmission path 10 along which the uncompressed presentation content from the source device 100 propagates downstream toward the presentation device 700. For convenience, the propagation of a signal generally away from the source device 100 and generally toward the presentation device 700 is nominally described herein as downstream propagation. This convention is maintained herein without regard to whether the signal is actually provided by the source device and without regard to whether the signal actually reaches the presentation device. Conversely, propagation of a signal generally away from the presentation device 700 and toward the source device 100 is nominally described herein as upstream propagation.

The first HDMI cable 200 includes opposing cable heads 202 and 204 connected together by an elongate cable body 206. Within the cable body 206, as shown in FIG. 2, a number of elongate electrically-conductive lines 208 support the propagation of respective electrical first signal components in HDMI format from the source device 100 to the first conversion device 300. The conductive lines may be electrically insulated and isolated from each other, and may be arranged as twisted pairs. First and second cable heads 202 and 204, commonly represented in FIG. 3, include a number of electrically-conductive members 210 in respective electrical communication with the conductive lines 208. The cable heads 202 and 204 respectively engage the HDMI connector 102 of the source device 100 and the HDMI connector 302 of the first conversion device 300. Thus, as electrical first signal components in HDMI format propagate along respective conductive lines 208 of the HDMI cable 200, the uncompressed presentation content provided by the source device 100 is conveyed from the source device 100 to the first conversion device 300. The cable heads 202 and 204 may each be constructed in male or female configuration according to their respective engagements with the HDMI connectors 102 and 302, which may each be constructed in female or male configuration. The construction of the second HDMI cable 600 is similar to that of the first HDMI cable 200. Opposing first and second cable heads 602 and 604 of the second HDMI cable 600 may each be constructed in male or female configuration according to their respective engagements with the HDMI connectors 502 and 702 of the second conversion device 500 and the presentation device 700.

The coaxial cable 400 in FIG. 1 includes opposing coaxial-cable heads 402 and 404 connected together by an elongate cable body 406. Within the cable body 406, as shown in FIG. 4, a central electrically conductive member 408 is coaxially surrounded by an insulator 410, a braided wire shield 412, and an outer insulating protective body layer 414. Cable heads 402 and 404, commonly represented in FIG. 4, each include a collar 420, which grasps the cable body 406, and a locking barrel 422 that is rotatable relative to the collar. The first and second conversion devices 300 and 500 include respective coaxial-cable connectors 304 and 504, each of which is commonly represented in FIG. 4 to include a circular cylinder 308 and external threads 310 extending helically around the cylinder. When the transmission path 10 is assembled, the cable heads 402 and 404 respectively engage the coaxial-cable connectors 304 and 504 as shown in FIG. 1. The engagements are releasably secured as the locking barrels 422 of the cable heads 402 and 404 receive the cylinders 308 and are turned about the cylinders such that the external threads 310 engage internal threads within the locking barrels 422. The illustrated cable connectors 304 and 504 are known as F-type connectors. It should be understood that these descriptions relate to a variety of coaxial-cable heads and coaxial-cable connectors. For example, in at least one other embodiment, the coaxial-cable connectors 304 and 504 are BNC-type connectors.

When the coaxial-cable heads 402 and 404 engage the coaxial-cable connectors 304 and 504 as shown in FIG. 1, the single electrically conductive member 408 (FIG. 4) is placed in electrical communication, at opposing ends thereof, with electrically conductive contact members within the coaxial-cable connectors. Thus, in FIG. 1, the first and second conversion devices 300 and 500 are in electrical communication through the single electrically conductive member 408 (FIG. 4). Such engagements may also ground the shield 412 of the coaxial cable to minimize various electrical disturbances, such as radio frequency interferences, from affecting signal propagation along the single electrically conductive member 408.

Each of the content source device 100, the first HDMI cable 200, the coaxial cable 400, the second HDMI cable 600, and the presentation device 700 may be selected according to user preferences from available and known devices and cables. The coaxial cable 400 may be assembled at a user location according to the dimensions of a room and according to the desired placements of the content source device and the presentation device. For example, a technician may install the entertainment or educational presentation system 1000 at the home or business location of a client. In that example, the coaxial cable 400 is assembled by crimping or otherwise attaching the cable heads onto a desired length of cable body 406 and the flexible coaxial cable is disposed along a desired itinerary, which may include paths under floors, under carpets, above ceilings, within walls, around architecture, around furniture, and around other obstacles. This represents considerable advantages provided by inventive and non-obvious aspects of the first conversion device 300 and the second conversion device 500.

The propagation of the electrical first signal components in HDMI format along respective conductive lines 208 (FIG. 2) of the first HDMI cable 200 (FIG. 1) represents conventional and known propagation of presentation content in HDMI format. Similarly, the propagation of the presentation content along the second HDMI cable 600 represents conventional and known propagation of uncompressed presentation content in HDMI format. The propagation of the uncompressed presentation content along the transmission path 10, however, is supported by particularly inventive aspects of the first conversion device 300 and the second conversion device 500. For example, the receipt of uncompressed presentation content in HDMI format and transmission of that content along a single electrically conductive member is supported by novel and non-obvious aspects of the first conversion device 300.

Advantageously, despite that the transmission path 10 may vary in length and direction to suit user needs and despite that the length of the transmission path may be great, the uncompressed presentation content enters the transmission path 10 in HDMI format and is entirely provided to the presentation device 700 in the HDMI format without any reduction of the presentation content due to data compression, signal degradation, or other losses. All of the digital information provided in HDMI format by the source device (FIG. 1) is preserved and conveyed along the single electrically conductive member 408 (FIG. 5) in an uncompressed second format and is delivered in HDMI format to the presentation device 700. For example, the length of the transmission path 10 may exceed twenty five feet.

In the particular embodiment diagrammatically represented in FIG. 5, the first conversion device 300 converts the uncompressed presentation content to an uncompressed second format in which the presentation content is conveyed by oscillatory electrical signal components. Each of these oscillatory electrical signal components resides in a respective frequency range that is different from the frequency ranges of the other oscillatory electrical signal components. Thus, the oscillatory electrical signal components may be transmitted simultaneously together along a single conductive medium with minimal mutual interferences. In this embodiment, the second format is analogous to a frequency division multiplexing (FDM) format. The oscillatory electrical signal components together entirely convey presentation content along the single conductive member 408. Though the transmission of presentation content in conventional HDMI format requires multiple conductive lines, presentation content in FIG. 5 is conveyed along the single conductive member 408 disposed between the inventive first and second conversion devices 300 and 500.

The first conversion device 300, the second conversion device 500, and the coaxial cable 400 are diagrammatically represented in FIG. 5. The first conversion device 300 includes the HDMI connector 302 in which electrically conductive members 311-314, 315A-B, 316A-B, 318, and 320 are disposed to contact corresponding conductive members 210 (FIG. 3) of the cable head 204. The input members 311-314 receive HDMI signal components in an HDMI format from the HDMI cable 200 (FIG. 1) when presentation content is conveyed along the HDMI cable from the content source device 100. In particular, the input members 311, 312, and 313 receive respective signals conventionally known as channel zero, channel one, and channel two HDMI signal components that together convey uncompressed presentation content. The channel zero, channel one, and channel two HDMI signal components together conventionally convey video, audio, and auxiliary data in a transition minimized differential signaling (TMDS) protocol. The input member 314 receives a signal conventionally known as the clock channel HDMI signal component, which relates to the rate at which video and audio content is presented.

The first conversion device 300 (FIG. 5) further includes modulator devices 321-324 in respective electrical communication with the input members 311-314. Upon receipt of HDMI signal components at the input members 311-314, the modulator devices generate respective oscillatory electrical signal components together entirely conveying the uncompressed presentation content conveyed by the HDMI signal components. Each of the modulator devices 321-324 generates its oscillatory signal component in a respective frequency range that is different from the frequency ranges of the other modulator devices. The first conversion device 300 further includes first filters 331-334 in respective electrical communication with the modulator devices 321-324. Each first filter 331-334 receives the oscillatory electrical signal component generated by a respective modulator device 321-324 and permits that signal component to propagate upstream in the respective frequency range of the modulator device while attenuating or blocking other frequencies from propagating upstream. For example, the filter 331 permits oscillatory electrical signal components to propagate upstream in the frequency range of the modulator device 321 while attenuating or blocking other frequencies from propagating upstream. Modulator devices typically generate unwanted harmonic by-products at higher multiples of their designated frequency ranges. The first filters block such by-products to prevent interference effects among the oscillatory electrical signal components generated by the modulator devices as the signal components are transmitted together along the single conductive member 408.

The first conversion device 300 (FIG. 5) further includes a modulator device 325A and a demodulator device 325B in respective electrical communication with the input member 315A and output member 315B. The devices 325A and 325B respectively support downstream and upstream consumer electronics control (CEC) signals. CEC signals convey control data related to controlling and synchronizing functions among various electronic devices in a user's environment. For example, CEC signals may facilitate an entertainment system wherein several devices are prompted to power up and down by the actuations of a single power switch of one of the devices. The modulator device 325A receives downstream-propagating CEC signals in HDMI format from the input member 315A and responsively generates corresponding downstream-propagating CEC-related oscillatory electrical signals. The demodulator device 325B receives upstream-propagating CEC-related oscillatory electrical signals, responsively generates upstream-propagating CEC signals in HDMI format, and provides the generated upstream-propagating CEC signals to the output member 315B. The devices 325A and 325B operate in different frequency ranges. A diplexer 335 in electrical communication with the devices 325A and 325B routes downstream and upstream CEC-related oscillatory electrical signals according to the different respective frequency ranges.

The first conversion device 300 further includes a modulator device 326A and a demodulator device 326B in respective electrical communication with the input member 316A and output member 316B. The devices 326A and 326B respectively support downstream and upstream display data channel (DDC) signals. DDC signals convey data related to settings and configurations among various electronic devices in a user's environment. For example, DDC signals may facilitate an entertainment system wherein a content source device queries a downstream presentation or recording device to determine the configuration and capabilities of the downstream device. DDC signals also may facilitate automated content protection in a high-bandwidth digital content protection (HDCP) protocol, by which a content source device may prevent a downstream device from receiving or recording restricted content. The modulator device 326A receives downstream-propagating DDC signals in HDMI format from the input member 316A and responsively generates corresponding downstream-propagating DDC-related oscillatory electrical signals. The demodulator device 326B receives upstream-propagating DDC-related oscillatory electrical signals, responsively generates corresponding upstream-propagating DDC signals in HDMI format, and provides the generated upstream-propagating DDC signals in HDMI format to the output member 316B. The devices 326A and 326B operate in different frequency ranges. A diplexer 336 in electrical communication with the devices 326A and 326B routes downstream and upstream oscillatory electrical DDC-related signals according to the different respective frequency ranges.

An upstream electronic device can provide power to a downstream device through the conductive member 320, which can be held at a five volt direct-current (DC) potential by the upstream device. The conductive member 318 facilitates detection of the downstream device by conveying a hot-plug-detect signal. The upstream device typically provides downstream power only upon confirmation that a downstream device is present by way of a hot-plug-detect signal. A modulator device 328 in electrical communication with the conductive member 318 generates an oscillatory electrical signal, in a particular frequency range, conveying data corresponding to hot-plug-detect signals. The filter 338 permits upstream propagation of the signal generated by the modulator device 328 in the particular frequency range but prevents harmonic by-products potentially generated by the modulator device from reaching the first coaxial cable 400. A capacitor 340 blocks any DC potential held at the conductive member 320 from affecting the various filters and diplexers 331-334, 335, 336, and 338. A connection 344 bypasses the capacitor so the DC potential reaches the electrically conductive member 408 of the coaxial cable 400.

The oscillatory electrical signals generated by the modulator devices 321-324, 325A, 326A, and 328 propagate downstream by way of respectively associated filters and diplexers and reach a junction 342 where the oscillatory electrical signals are combined and together propagate, as a multi-frequency combined signal, further downstream toward the coaxial cable 400. The capacitor 340 generally permits passage of signals in the frequency ranges of the oscillatory electrical signals generated by the modulator devices. Upon reaching the coaxial cable connector 304, which is engaged with the coaxial cable 400 at the cable head 402, the oscillatory electrical signals are transmitted together, as the multi-frequency combined signal, from the connector and along the electrically conductive member 408. Thus, the uncompressed presentation content received through the HDMI connector 302 of the modulator device 300 is entirely transmitted along the single electrically conductive member 408. Any DC potential held at the conductive member 320 is accordingly held along the conductive member 408.

The second conversion device 500 has several components corresponding to those of the first conversion device 300. Upon reaching the cable head 404, which is engaged with the coaxial cable connector 504 of the second conversion device, the oscillatory electrical signals transmitted along the conductive member 408 are permitted by the capacitor 540 to propagate to the junction 542 and to a number of filters and diplexers. The capacitor blocks any DC potential held along the conductive member 408 from affecting the various filters and diplexers of the second conversion device. A connector 544 bypasses the capacitor so that any DC potential held along the conductive member 408 is accordingly held at the conductive member 520 for the provision of electrical power to a downstream device.

The filters 531-534 and demodulator devices 521-524 of the second conversion device 500 correspond to the filters 331-334 and modulator devices 321-324 of the first conversion device 300. The filters 531-534 permit essentially the same frequencies permitted respectively by the filters 331-334. Accordingly, the filters 531-534 each receive the multi-frequency combined signal transmitted by the first conversion device but permit passage of only those oscillatory electrical signals respectively generated by the modulator devices 321-324. Thus, each demodulator device 521-524 receives essentially only the oscillatory electrical signal component generated by a respective modulator device 321-324. The demodulator devices 521-524 generate HDMI format signal components that convey the uncompressed presentation content respectively received at the input members 311-314 of the first conversion device. The second conversion device 500 includes the HDMI connector 502 in which electrically conductive members 511-514, 515A-B, 516A-B, 518, and 520 are disposed to contact corresponding conductive members of the cable head 602 (FIG. 1). The conductive output members 511-514 (FIG. 5) receive the signal components in HDMI format generated by the modulator devices 521-524 and transmit those signal components to the presentation device 700 (FIG. 1) through the HDMI cable 600.

In FIG. 5, the diplexer 535, the demodulator device 525A, and the modulator device 525B of the second conversion device 500 correspond respectively to the diplexer 335, the modulator device 325A, and the demodulator device 325B of the first conversion device 300. The demodulator device 525A receives downstream-propagating CEC-related oscillatory electrical signals generated by the modulator device 325A and responsively generates corresponding downstream-propagating CEC signals in HDMI format. The demodulator device 525B receives upstream-propagating CEC signals in HDMI format and responsively generates corresponding upstream propagating CEC-related oscillatory electrical signals for receipt by the demodulator device 325B. The devices 525A and 525B operate respectively in the same frequency ranges as the devices 325A and 325B. The diplexer 535 in electrical communication with the devices 525A and 525B routes downstream and upstream CEC-related oscillatory electrical signals according to those frequency ranges. The devices 525A and 525B are in respective electrical communication with the output member 515A and input member 515B. In FIG. 5, when CEC signals in HDMI format are received at the input member 315A, corresponding CEC signals in HDMI format are provided downstream at the output member 515A for provision of CEC signals to a downstream device. Similarly, when CEC signals in HDMI format are received at the input member 515B, corresponding CEC signals in HDMI format are provided upstream at the output member 315B for provision of CEC signals to an upstream device.

Furthermore, the diplexer 536, the demodulator device 526A, and the modulator device 526B of the second conversion device 500 correspond respectively to the diplexer 336, the modulator device 326A, and the demodulator device 326B of the first conversion device 300. The demodulator device 526A receives downstream-propagating DDC-related oscillatory electrical signals generated by the modulator device 326A and responsively generates corresponding downstream-propagating DDC signals in HDMI format. The demodulator device 526B receives upstream-propagating DDC signals in HDMI format and responsively generates corresponding upstream propagating DDC-related oscillatory electrical signals for receipt by the demodulator device 326B. The devices 526A and 526B operate respectively in the same frequency ranges as the devices 326A and 326B. The diplexer 536 in electrical communication with the devices 526A and 526B routes downstream and upstream DDC-related oscillatory electrical signals according to those frequency ranges. The devices 526A and 526B are in respective electrical communication with the output member 516A and input member 516B. In FIG. 5, when DDC signals in HDMI format are received at the input member 316A, corresponding DDC signals in HDMI format are provided downstream at the output member 516A for provision of DDC signals to a downstream device. Similarly, when DDC signals in HDMI format are received at the input member 516B, corresponding DDC signals in HDMI format are provided upstream at the output member 316B for provision of DDC signals to an upstream device.

The filter 538 and the demodulator device 528 of the second conversion device 500 correspond respectively to the filter 338 and the modulator device 328 of the first conversion device 300. The modulator and demodulator devices 328 and 528 are operative in the same particular frequency range. The filters 338 and 538 both permit passage only of signals in that particular frequency range. The oscillatory electrical signals generated by the modulator device 328 are received by the demodulator device 528, which responsively generates a corresponding hot-plug-detect signal and provides that signal to the conductive member 518. Thus, when hot-plug-detect signals are received at the conductive member 318, corresponding hot-plug-detect signals are provided at the conductive member 518 to facilitate the detection of a downstream device.

In FIG. 5, the modulator and demodulator devices of the first conversion device 300 are functionally paired with demodulator and modulator devices of the second conversion device 500 in one-to-one correspondence. Each pair operates in a frequency range that is different from the frequency ranges of the other pairs. This permits paired devices to communicate with each other across the single electrically conductive member 408 without interfering with other pairs. Each pair contributes, in its frequency range, to the multi-frequency combined signals that propagate along the conductive member. An exemplary relative allocation scheme 600 for allocating frequency ranges to the pairs is provided in FIG. 6. The frequency axis 602 represents a frequency domain with a lower bound at the zero hertz limit, representing DC signals, and an upper bound that extends into radio-frequency (RF) ranges. The upper bound may vary with each particular embodiment of the invention. Thus, the frequency axis appears without any associated absolute units. It should be understood that the ordering of the pairs along the frequency axis 602 is exemplary and may also vary with each particular embodiment of the invention.

In FIG. 6, the frequency range 621 is allocated to the paired devices 321 and 521 (FIG. 5), which communicate signals related to channel zero HDMI signal components. Furthermore, the frequency range 622 is allocated to the paired devices 322 and 522, which communicate downstream signals related to channel one HDMI signal components. The frequency range 623 is allocated to the paired devices 323 and 523, which communicate downstream signals related to channel two HDMI signal components. The frequency range 624 is allocated to the paired devices 324 and 524, which communicate downstream signals related to clock channel HDMI signal components. The frequency range 625A is allocated to the paired devices 325A and 525A, which communicate downstream CEC-related signals. The frequency range 625B is allocated to the paired devices 325B and 525B, which communicate upstream CEC-related signals. The frequency range 626A is allocated to the paired devices 326A and 526A, which communicate downstream DDC-related signals. The frequency range 626B is allocated to the paired devices 326B and 526B, which communicate upstream DDC-related signals. The frequency range 628 is allocated to the paired devices 328 and 528, which communicate data related to hot plug detect signals. The low frequency range 620 is reserved for holding the conductive member 408 at a DC electric potential level when power is provided from one device to another by way of the paired conductive members 320 and 520.

In the presentation system 1000 of FIG. 1, which may be installed in a user's environment, the first conversion device 300 and the second conversion device 500 can be respectively disposed near the content source device 100 and a presentation device 700. Uncompressed presentation content received in HDMI format by the first conversion device can advantageously be transmitted along a single conductive member in a multi-frequency format to the second conversion device without loss of quality in the presentation content. The conductive member through which the conversion devices communicate can be a coaxial cable. Coaxial cables are inexpensive, are readily available in a variety of lengths, are easily assembled to meet varying client expectations, and are familiar to typical technicians. For example, home entertainment and cable television installation technicians typically include rolls of coaxial cable, coaxial cable heads, and cable assembly tools in their portable gear and house-call vehicles.

It should be understood that the HDMI cables 200 and 600 are illustrated in FIG. 1 in order to provide a thorough representation of a typical user environment in which the first and second conversion devices 300 and 500 may be deployed. Alternatively, the first conversion device and the second conversion devices may be directly connected respectively to a source device and a presentation device without HDMI cables insofar as the HDMI connectors of the conversion devices may be structured to engage HDMI connectors of the source and presentation devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A presentation system comprising:
    a source device providing uncompressed presentation content in a High-Definition Multimedia Interface (HDMI) format;
    an electrically conductive member;
    a first conversion device in electrical communication with the source device and the electrically conductive member, the first conversion device receiving the uncompressed presentation content from the source device and converting the uncompressed presentation content to an uncompressed second format, the first conversion device entirely transmitting the uncompressed presentation content in the second format along the electrically conductive member;
    a second conversion device in electrical communication with the electrically conductive member, the second conversion device entirely receiving the uncompressed presentation content in the second format from the electrically conductive member and converting the uncompressed presentation content to the HDMI format; and
    a presentation device in electrical communication with the second conversion device, the presentation device entirely receiving the uncompressed presentation content in the HDMI format, the presentation device presenting the uncompressed presentation content.

2. The presentation system of claim 1, the first conversion device converting the uncompressed presentation content to a second format in which the uncompressed presentation content is conveyed by oscillatory electrical signal components each in a respective frequency range.

3. The presentation system of claim 1, the electrically conductive member having a contiguous length in excess of twenty five feet.

4. The presentation system of claim 1, in which the first conversion device, the electrically conductive member, and the second conversion device define a transmission path along which the uncompressed presentation content from the source device propagates toward the presentation device, the transmission path having a length in excess of twenty five feet.

5. A system comprising:
    a first High-Definition Multimedia Interface (HDMI) connector including electrically conductive input members structured to receive respective electrical first HDMI signal components together conveying uncompressed presentation content in an HDMI format;
    an electrically conductive member;
    modulator devices in respective electrical communication with the input members, the modulator devices structured to generate respective oscillatory electrical signal components together entirely conveying the uncompressed presentation content in an uncompressed second format upon receipt of the respective electrical first HDMI signal components by the input members, the modulator devices in electrical communication with the electrically conductive member, the modulator devices structured to transmit the oscillatory electrical signal components along the electrically conductive member entirely conveying the uncompressed presentation content in the second format along the electrically conductive member;
    demodulator devices in electrical communication with the electrically conductive member, the demodulator devices structured to generate respective electrical second HDMI signal components together entirely conveying the uncompressed presentation content in the HDMI format upon receipt of the oscillatory electrical signal components from the electrically conductive member; and
    a second HDMI connector including electrically conductive output members in respective electrical communication with the demodulator devices.

6. The system of claim 5, the electrically conductive member comprising the central electrically conductive member of a coaxial cable.

7. The system of claim 5, the electrically conductive member having a length in excess of twenty five feet.

8. The system of claim 5, the modulator devices structured to generate respective oscillatory electrical signal components in respective frequency ranges, the frequency range of each oscillatory electrical signal component being different from the frequency range of each other oscillatory electrical signal component.

9. The system of claim 8, further comprising first filters in respective electrical communication with the modulator devices, each first filter structured to permit passage of the oscillatory electrical signal component of a respective modulator device in the respective frequency range of the respective modulator device.

10. The system of claim 8, further comprising filters in electrical communication with the electrically conductive member and in respective electrical communication with the demodulator devices, each filter structured to pass a respective oscillatory electrical signal component in its respective frequency range from the electrically conductive member to a respective demodulator device.

11. A system comprising:
a first High-Definition Multimedia Interface (HDMI) connector including electrically conductive input members structured to receive respective electrical first signal components in an HDMI format together conveying presentation content;
a first coaxial-cable connector;
modulator devices in respective electrical communication with the input members, the modulator devices structured to generate respective oscillatory electrical signal components in an uncompressed second format together entirely conveying the uncompressed presentation content upon receipt of the respective electrical first signal components in the HDMI format by the respective input members, the modulator devices in electrical communication with the first coaxial-cable connector, the modulator devices structured to transmit the oscillatory electrical signal components in the second format from the first coaxial-cable connector;
a second coaxial-cable connector;
demodulator devices in electrical communication with the second coaxial-cable connector, the demodulator devices structured to generate respective electrical second signal components in the HDMI format upon receipt of the oscillatory electrical signal components in said second format by the second coaxial-cable connector, the second signal components in the HDMI format together entirely conveying uncompressed presentation content conveyed by the received oscillatory electrical signal components in said second format; and
a second HDMI connector including electrically conductive output members in respective electrical communication with the demodulator devices.

12. The system of claim 11, the modulator devices structured to generate respective oscillatory electrical signal components in the second format in respective frequency ranges, the frequency range of each oscillatory electrical signal component being different from the frequency range of each other oscillatory electrical signal component.

13. The system of claim 12, further comprising first filters in respective electrical communication with the modulator devices, each first filter structured to permit passage of the oscillatory electrical signal component of a respective modulator device in the respective frequency range of the respective modulator device.

14. The system of claim 12, further comprising filters in electrical communication with the second coaxial cable connector and in respective electrical communication with the demodulator devices, each filter structured to pass an oscillatory electrical signal component in a respective one of the frequency ranges from the second coaxial cable connector to a respective one of the demodulator devices.

15. The system of claim 11, further comprising a coaxial cable and a third coaxial cable connector, the third coaxial cable connector structured to be attached to the coaxial cable, the third coaxial cable connector structured to be attached to either of the first and second coaxial cable connectors.

16. The system of claim 15, the coaxial cable having a length in excess of twenty five feet.

* * * * *